(No Model.)  2 Sheets—Sheet 1.

L. HERBERT.
ADJUSTABLE PISTON PACKING.

No. 266,365.  Patented Oct. 24, 1882.

Witnesses:
Geo. H. Strong
J. H. Rouse

Inventor,
Louis Herbert
By Dewey & Co.
Attorney

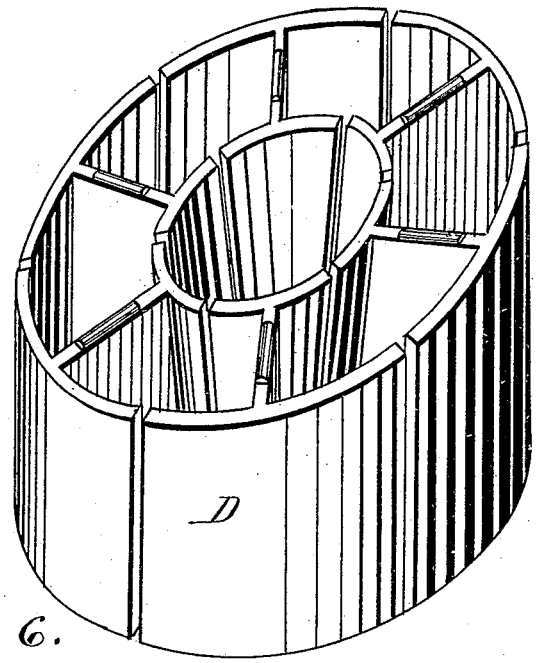
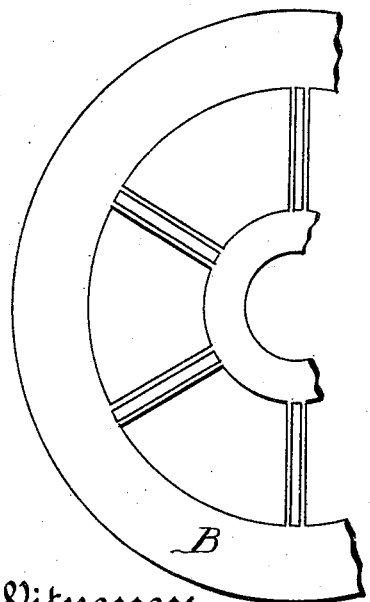
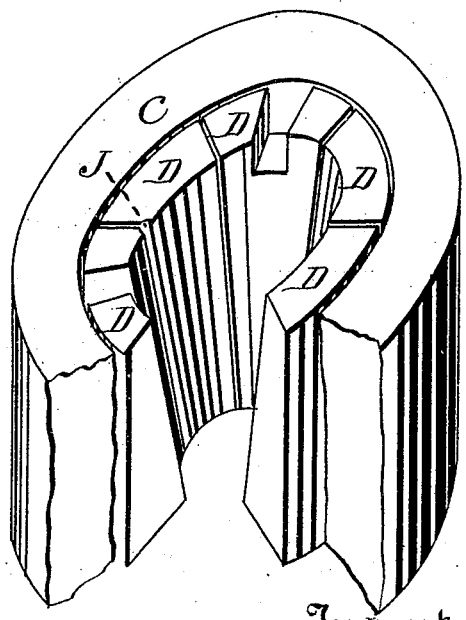

UNITED STATES PATENT OFFICE.

LOUIS HERBERT, OF HICKSVILLE, CALIFORNIA.

ADJUSTABLE PISTON-PACKING.

SPECIFICATION forming part of Letters Patent No. 266,365, dated October 24, 1882.

Application filed June 29, 1882. (No model.)

*To all whom it may concern:*

Be it known that I, LOUIS HERBERT, of Hicksville, county of Sacramento, State of California, have invented an Improved Adjustable Piston-Packing; and I hereby declare the following to be a full, clear, and exact description thereof.

My invention relates to an improvement in the regulation and adjustment of piston-packing; and it consists of a conical nut which fits upon a screw-thread upon the piston-rod, so that by turning the rod the cone will be advanced within the piston. The piston may be composed of a head and a follower, between which are a number of metal sections surrounding the piston-rod. The exterior surface of these sections, when all are in place, form a cylindrical body between the head and follower, upon which the elastic packing is fitted. The interior of this sectional cylinder is bored conically to allow the nut before mentioned to fit within it. When the nut is advanced within this conical bore it will separate the sections, forcing them outwardly, and will thus expand the packing equally in every direction. In combination with this mechanism are employed a pawl and ratchet to hold the cone wherever desired and prevent its turning back, so as to relax the packing.

Figure 1:
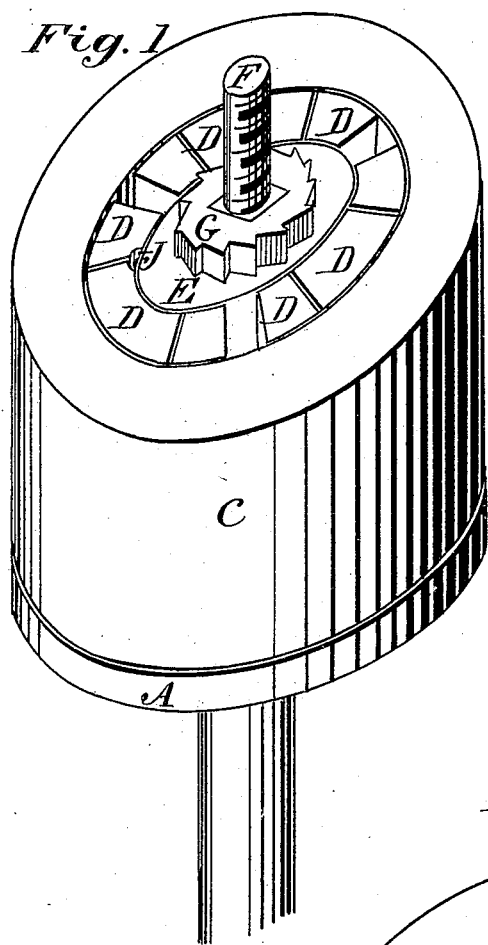
Figure 2:
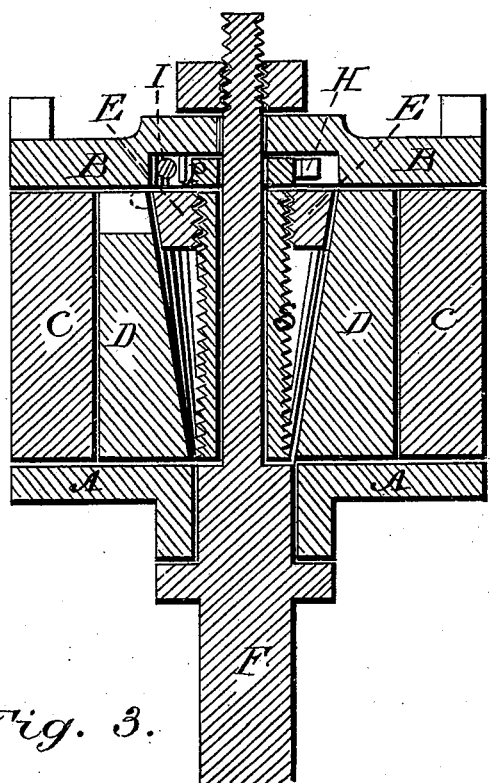
Figure 3:
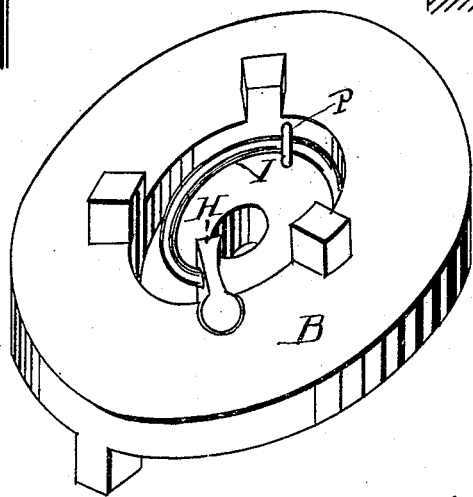

Referring to the accompanying drawings for a more complete explanation of my invention, Figure 1 is an interior perspective view, showing the elastic rubber packing, the interior sectional cylinder, and the ratchet. Fig. 2 is a section taken through the axis of the piston. Fig. 3 is a detached view of the follower with the pawl. Fig. 4 is a perspective view of a portion of the elastic packing and the conically-bored sectional cylinder. Fig. 5 is a view of a piston having open water-passages through the sections for a single-acting pump. Fig. 6 is a plan of a follower, all the above figures being inverted.

A is the head, and B the follower, of a piston, having a considerable space intervening between them for the reception of the elastic ring-packing C, which fills the cylinder and makes a tight fit. Within this packing-ring is a cylindrical body, occupying the space between the heads, and upon which the packing C is fitted. This cylinder is formed of six or any desired number of sections, D, and is bored with a conically-shaped hole through it, as shown. Within this hole is fitted a conically-shaped nut, E, of considerable length, which is fitted to a threaded sleeve, S, which passes over the end of the piston-rod F, and when in place within the conical nut and sectional cylinder its upper end is flush with the end of said sectional cylinder. A collar is formed on or fixed to the piston-rod just outside the head A, so that the piston-rod may be turned, and thus draw the nut into the sectional cylinder, so as to force the sections apart, and thus expand the packing to fit the interior of the pump or other cylinder whenever it may be worn so as to be slack. Projections P on the plunger engage similar projections on the end of the cylinder to prevent the former being turned when the packing is being set out. In order to prevent the nut being turned back or to allow the piston to be turned by turning the rod if it is not in the right position to make connections, a ratchet, G, is fixed to the screw-cone, and a pawl, H, is fixed to the follower B, with a spring, I, to cause it to engage with the teeth of the ratchet.

The operation will then be as follows: When everything is in position the packing-ring C will encircle the sectional cylinder D, being kept in place by the head A and the follower B. The screw-cone E is drawn into the conical opening through the center of the sections by turning the piston-rod until the cone is at the proper place within the piston and the ring made to fit the pump or other cylinder in which it works.

If the piston-rod is not in the proper position to make connection with the rest of the machinery when the packing has been brought to a fit, the rod and piston may be turned until in the right position, the pawl and ratchet preventing the nut from being turned backward upon the rod.

The conical nut may have a projection or feather upon one or both sides to enter similarly-shaped grooves, J, within the sectional cylinder, and thus prevent its turning around when the piston-rod is turned.

When the piston is to be used as a plunger for double-acting pumps the sections may be solid; but if it is necessary to have openings through, as in single-acting pumps, the sections are made skeleton in shape, as shown in Fig. 5.

The whole device is easily regulated without removing from the cylinder, it being only necessary to turn the piston-rod, after disconnecting it, until the packing has been properly expanded.

I have described my device as being applicable to pumps; but it will readily be seen that it may be used with any expansible packing and in any class of cylinder.

Having thus described my invention, what I claim as new, and desire to secure by Letters Patent, is—

The tapering nut E, fitting the screw-thread upon the sleeve S, surrounding the piston-rod F, so as to be advanced into the conically-bored sectional cylinder D to separate the sections and expand the packing, in combination with the ratchet G and pawl H, substantially as and for the purpose herein described.

In witness whereof I have hereunto set my hand.

LOUIS HERBERT.

Witnesses:
G. W. EMERSON,
S. H. NOURSE.